United States Patent [19]

Stinnett

[11] 4,186,507

[45] Feb. 5, 1980

[54] PORTABLE DUCK BLIND

[76] Inventor: Arvil L. Stinnett, 712 S. 104th St., Edwardsville, Kans. 66113

[21] Appl. No.: 827,116

[22] Filed: Aug. 24, 1977

[51] Int. Cl.² ............................................. A01M 31/00
[52] U.S. Cl. ................................................................. 43/1
[58] Field of Search .................. 43/1; 135/1 R, 4 R; 52/63; 297/217

[56] References Cited

U.S. PATENT DOCUMENTS

| | | | |
|---|---|---|---|
| 2,159,273 | 5/1939 | Killinger | 135/1 R |
| 2,168,913 | 8/1939 | Middleton | 135/4 R |
| 3,540,170 | 11/1970 | Flowers | 43/1 |
| 3,848,352 | 11/1974 | Sayles | 43/1 |
| 3,886,678 | 6/1975 | Caccamo | 43/1 |
| 4,077,418 | 3/1978 | Cohen | 135/4 R |

*Primary Examiner*—Robert C. Watson
*Attorney, Agent, or Firm*—John A. Hamilton

[57] ABSTRACT

A portable duck blind consisting of a lightweight frame collapsible and foldable to a compact size for easy transportation, a pliably foldable cover adapted to be supported on the frame to form a concealing enclosure for one or more hunters, the cover having concealed openings for allowing the hunters to view the flight of game birds and a top flap which is easily displaced to allow the hunters to stand for shooting, and a hollow stool on which a hunter may sit while occupying the blind, and into which the folded cover may be placed for storage.

1 Claim, 9 Drawing Figures

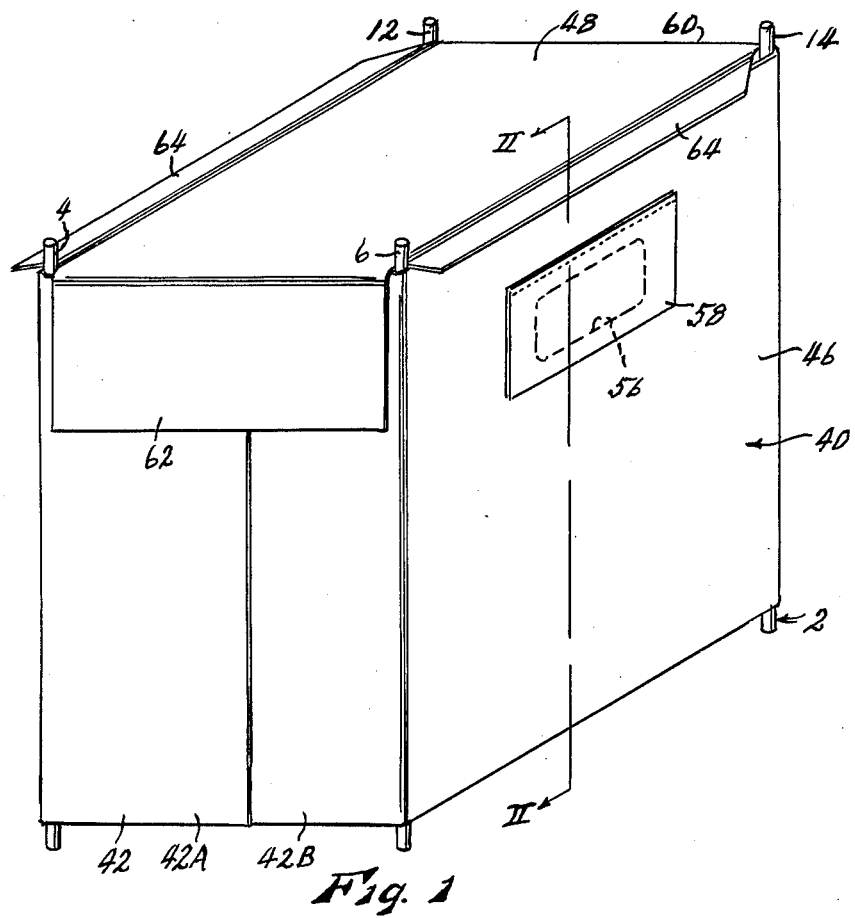
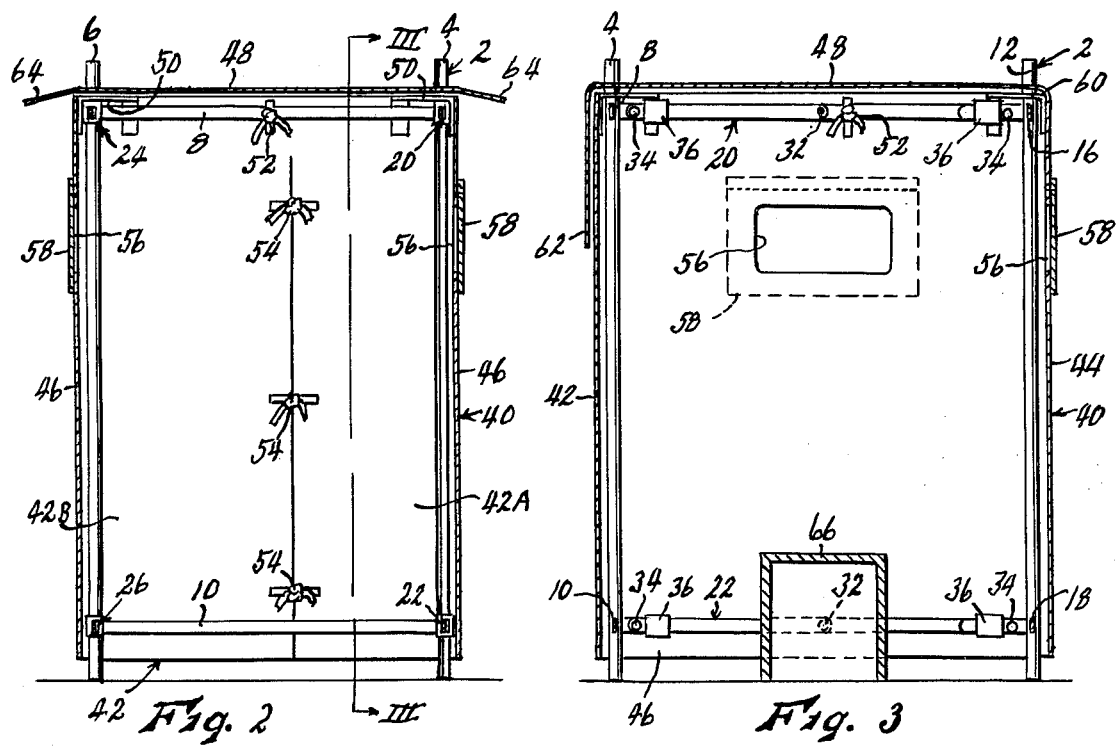

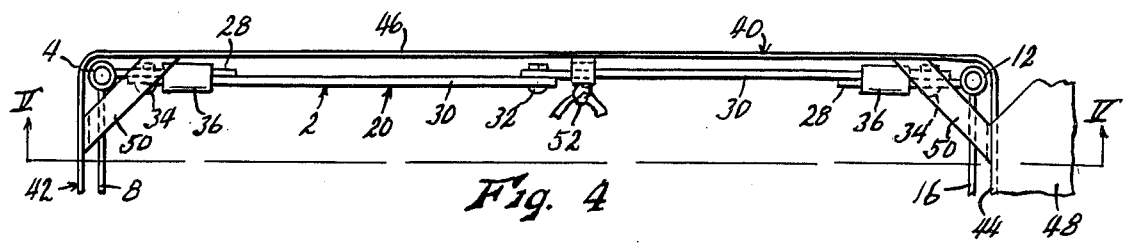
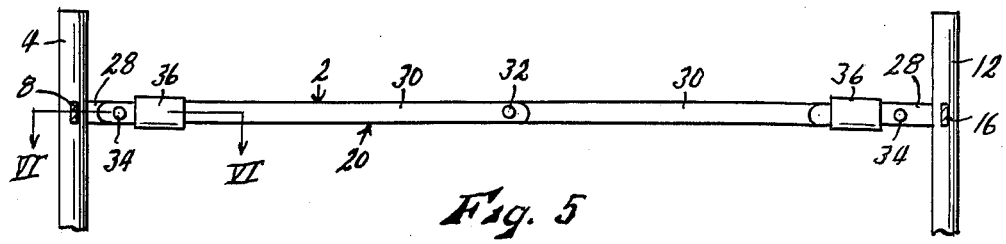
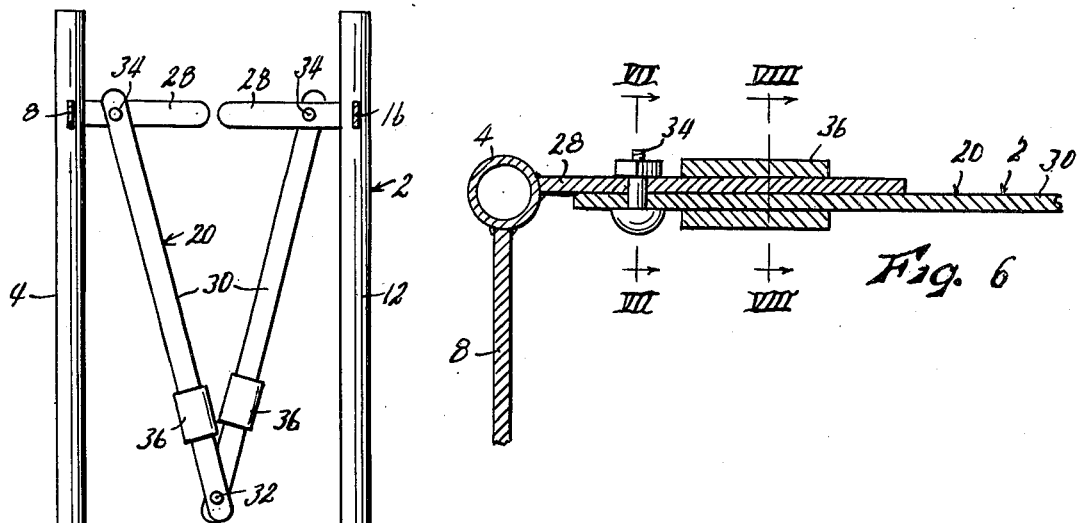
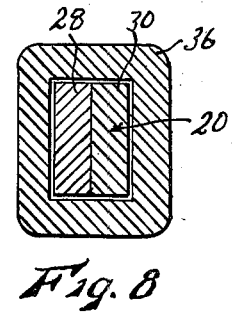
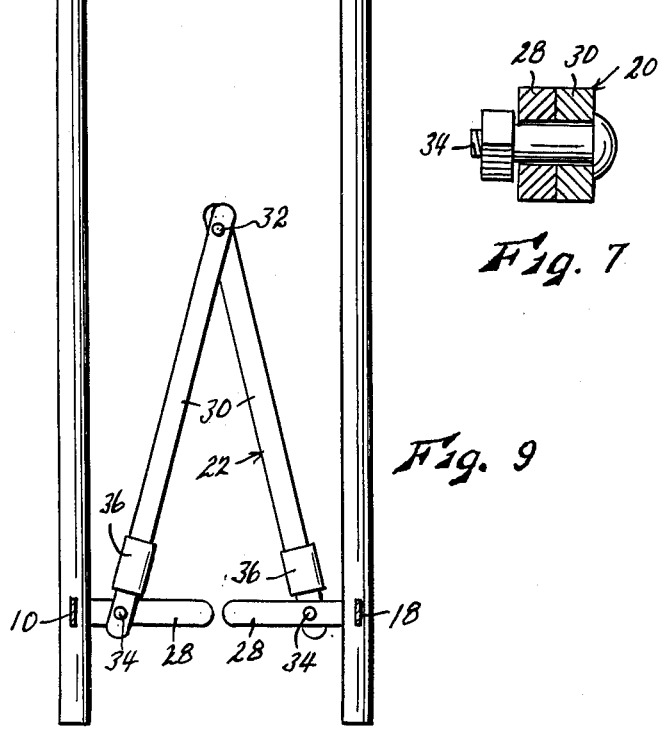

PORTABLE DUCK BLIND

This invention relates to new and useful improvements in blinds for concealing a hunter or hunters in quest of ducks, geese and other game birds.

It is well known that when hunting wildfowl, the hunter must often wait for long periods of time for the birds to approach within gunshot range, and that during this time the hunter must remain in concealment, since the birds are quite wary and have extremely sharp eyesight, especially in being able to detect any unusual movement, or light reflections from any light-colored or shiny objects. Natural cover providing such concealment is often very difficult to find, or non-existent in a given area, and for this reason the use of an artificial blind becomes necessary or desirable. The provision of an artificial blind for this purpose, and possessing certain novel features, is the overall object of the present invention.

One disadvantage of prior blinds has been their sheer bulk, which rendered portability and transportation thereof difficult. Accordingly, one object of the present invention is the provision of a blind of the character described which may be easily collapsed and folded to a compact size. A blind constructed according to the present invention, and large enough to accomodate one or two hunters, may easily be carried in the trunk of an automobile. To this end, the present blind consists of a frame collapsible to a flat, compact form, and a pliable cover adapted to be applied over and supported by said frame, but adapted when removed from the frame to be folded into a small space. A hollow box may serve both as a stool for a hunter while occupying the blind, and as a container for the folded cover during storage or transportation.

Another object is the provision of a blind of the character described which in use consists of only three separable parts, even including the box stool, so that there is little possibility that any part can be lost or mislaid. The frame is unitary in construction, and no disassembly is necessary for storage or transportation, and the cover is likewise of unitary construction and never requires disassembly.

A further object is the provision of a blind of the character described in which the cover has normally concealed openings permitting the hunter to observe the flight and movement of the birds, and a top consisting of a pliable flap normally held in place by gravity, but which is automatically deflected whenever the hunter stands to shoot after determining that birds on the wing are within range. The blind is of such height that when the hunter stands, at least his head and shoulders project above the blind. This gives him the necessary freedom of movement to aim and fire.

Other objects are extreme simplicity and economy of construction, efficiency and dependability of operation, ease and convenience of setup and takedown, and ready adaptability for camouflage.

With these objects in view, as well as other objects which will appear in the course of the specification, reference will be had to the accompanying drawing, wherein, FIG. 1 is a perspective view of a portable duck blind embodying the present invention, fully assembled and set up for use, FIG. 2 is a sectional view taken on line II—II of FIG. 1, FIG. 3 is a sectional view taken on line III—III of FIG. 2, FIG. 4 is an enlarged, fragmentary top plan view of the blind with the top flap folded back and broken away, showing one side edge portion of the blind, FIG. 5 is a fragmentary sectional view taken on line V—V of FIG. 4, with the cover omitted, FIG. 6 is an enlarged, fragmentary sectional view taken on line VI—VI of FIG. 5, FIG. 7 is an enlarged sectional view taken on line VII—VII of FIG. 6, FIG. 8 is an enlarged sectional view taken on line VIII—VIII of FIG. 6, and FIG. 9 is a complete view similar to FIG. 5, but showing the frame in its folded form.

Like reference numerals apply to similar parts throughout the several views, and the numeral 2 applies generally to the frame of the portable duck blind contemplated by the present invention. Said frame includes a front wall comprising a pair of vertical corner posts 4 and 6 rigidly connected together, respectively adjacent their upper and lower ends, by horizontal cross bars 8 and 10, and a rear wall comprising a pair of corner posts 12 and 14 rigidly connected together, respectively adjacent their upper and lower ends, by horizontal cross bars 16 and 18. The corner posts and cross bars are formed preferably of strong but light weight material, such as tubes and bars of steel, aluminum, plastic or the like.

One side wall of the frame is formed by corner posts 4 and 12 and a pair of foldable cross bars 20 and 22 extending horizontally between these corner posts respectively adjacent their upper and lower ends, while the other side wall is similarly formed by corner posts 6 and 14 and a pair of foldable cross bars 24 and 26 extending therebetween. All of foldable cross bars 20, 22, 24 and 26 are substantially identical, and as shown in FIGS. 4-9, each comprises a short stub bar 28 welded or otherwise rigidly affixed to each of the corner posts associated with that side wall, and extending toward the other of said corner posts, and a pair of longer bars 30 having their contiguous ends pivotally connected together on a horizontal transverse axis by a bolt 32, and having their distal ends pivoted respectively to the two stub bars 28 associated therewith, on horizontal transverse axes, by bolts 34. Bolts 32 and 34 are preferably shouldered, as indicated in FIG. 7, to preserve free pivotability of their connections. Bolts 34 are spaced well apart from the free ends of stub bars 28, and on each bar 30 there is slidably mounted a tubular sleeve 36 having an internal contour permitting it to engage slidably but snugly around bar 30 and stub bar 38, when said bars are aligned, thereby releasably locking said bars in aligned relation. When all of said sleeves, eight in number, are so engaged, they lock the frame in its extended use position, as best shown in FIGS. 1-3. When said sleeves are slidably disengaged from stub bars 28, the front and rear end walls of the frame may be moved closer together, with top cross bars 20 and 24 buckling downwardly, and bottom cross bars 22 and 26 buckling upwardly, as indicated in FIG. 9. In this manner, the frame of a blind large enough to serve one or two hunters may be so reduced in size as to be easily carried in the trunk of an automobile.

In use, the frame 2 is enveloped in a cover indicated generally by the numeral 40, and formed of a pliably foldable material such as canvas, sheet plastic or the like. It is sewed or otherwise formed to provide a front end wall 42, a rear end wall 44, side walls 46, and a top flap 48. End walls 42 and 44 and side walls 46 are so proportioned as to be engageable downwardly over the corner posts of the frame to form the four vertical walls of the blind enclosure, extending vertically from a point adjacent the lower ends of said corner posts to the level of top cross bars 20 of the frame side walls and the top cross bars 8 and 16 of the frame end walls, which are horizontally coplanar. To prevent the cover from sliding downwardly on the corner posts, a hanger strap 50, also formed of fabric or plastic, is sewed diagonally across each top corner of the cover, so as to pass inside of the associated corner post, and rest on the top cross bars of the frame walls. These hanger straps are best shown in FIG. 4. They are attached permanently to the cover, and do not interfere with the upward removal of the cover from the frame. To prevent the cover walls from sagging intermediate the corner posts, a cloth tie 52 is permanently attached to the top edge of each wall of the cover, intermediate its ends. This may be tied about the top cross bar of the associated frame wall. The number of ties required for each cover wall is determined by the pliability of the cover material, and by the size of the blind itself.

Front end wall 42 of the cover is divided vertically at its midline into a pair of separate flaps 42A and 42B, which may be parted to allow easy ingress and egress of a hunter to and from the interior of the blind. These flaps may be joined, after a hunter has entered, by cloth ties 54 attached to the inner sides of the flaps at their adjoining edges. Each of the side walls 46 of the cover, as well as rear wall 44, has a window opening 56 formed therein, said window opening normally being covered by a flap 58 also formed of canvas or other pliable material, and stitched or otherwise secured to the associated cover wall at its upper edge above the opening. Top flap 48 of the cover is generally rectangular, and is secured along one edge thereof to the top edge of rear cover wall 44, as indicated at 60, but its other three edges are free. It is of sufficient area to overlap and extend outwardly beyond the side and front walls of the blind, resting on the top edges of the cover and frame walls. It is notched at its corners to accomodate the corner posts of the frame, and its outward extension at the front and sides provides a front flap 62 and side flaps 64 which tend to hang downwardly by gravity, as shown, and which are of sufficient weight and extent to prevent the entire flap 48 from falling into the interior of the blind. A cubical box 66 may be rested on the ground within the blind, as shown in FIG. 3, to serve as a seat for a hunter occupying the blind. One face of said box is open, and it may serve as a container for receiving the entire cover 40 when said cover is removed from the frame and folded, for convenience of storage and transportation.

The functional use of the blind is believed to be obvious. Frame 2 is extended from the folded position shown in FIG. 9 to the extended position of FIGS. 1–5, and locked in this extended position by sliding lock sleeves 36 into engagement with stub bars 28. Cover 40 is then removed from box 66, unfolded, and applied downwardly over the corner posts of the frame as shown, and engaging hanger straps 50 inside of the upper end portions of the corner posts, also as shown. Box 66 may be placed inside of the blind to serve as a seat. Ties 52 are then tied to complete the mounting of the cover on the frame. The hunter may then enter the blind between flaps 42A and 42B of the front wall of the cover, seat himself on box 66, and secure the entry flaps with ties 54. He then arranges top cover flap 48 to cover the blind, as shown in FIG. 1.

The hunter is thus completely concealed from any nearby birds, who are thus not alarmed. In this connection, the material of the cover may be of any suitable color to blend with the natural colors of the surrounding terrain, as a further aid to camouflage, or printed with irregular patterns of said natural colors. The hunter may push flaps 58 of window openings 56 outwardly to view the flight and position of birds, and still remain largely invisible to any birds. When he determines that birds on the wing are within gunshot range, he rises to his feet, thereby pushing top flap 48 of the cover aside. His upper body then projects above the blind, giving him the necessary freedom of movement to aim and fire his gun. Whenever he reseats himself on box 66, he rearranges top cover flap 48 to cover the top of the blind. The height of the blind is not particularly critical, but to insure that his head, shoulders and arms are above the blind when he stands, whereby to give him full freedom of movement for aiming and firing, a height of about four feet has been found satisfactory. This height also provides that his head will not rub against top flap 48 when he is seated on a low stool. Stool 66 as shown constitutes a 10 inch cube, although this dimension is also not particularly critical.

While I have shown and described a specific embodiment of my invention, it will be readily apparent that many minor changes of structure and operation could be made without departing from the spirit of the invention.

I claim:
1. A portable duck blind comprising:
   a. a frame of skeleton, generally rectilinear form of a size to house a hunter when in its extended use position, but being constructed of relatively pivoted elements whereby to be collapsible to a generally flat configuration for convenience of storage and transportation, comprising a pair of generally rigid, planar end walls each consisting of a pair of corner posts rigidly interconnected by cross bars extending horizontally therebetween, and a pair of side walls consisting of at least two pivoted bars extending between each pair of corresponding corner posts of said end walls, each of said pivoted bars being formed of a pair of sections pivotally joined together at their contiguous ends, and pivotally connected at their distal ends respectively to said corresponding pair of corner posts, the axes of all three of said pivotal connections being parallel with each other, and transverse to said pivoted bars and said corner posts,
   b. A short stub bar rigidly affixed to each of said corner posts at each end of each of said pivoted bars, whereby to extend in overlapping, aligned relation to the adjacent section of the associated pivoted bar when said section is disposed at right angles to the adjacent corner post,
   c. locking means releasably securing said frame in said extended use position, said locking means comprising a tubular sleeve mounted for sliding movement along each of the sections of each of said pivoted bars, whereby to be movable into or out of snugly encircling relation to the associated stub bar, and
   d. a cover consisting of an enclosure having side, end and top walls removably applicable over said frame when said frame is in said extended use position, whereby to form an enclosure capable of housing a hunter therewithin, said cover being formed of pliable sheet material whereby when it is removed from said frame, it may be folded into a relatively small package.

* * * * *